(12) United States Patent
Grinwald et al.

(10) Patent No.: US 12,366,431 B2
(45) Date of Patent: Jul. 22, 2025

(54) MODULAR COMBAT SYSTEM AND METHOD

(71) Applicant: ELBIT SECURITY SYSTEMS LTD., Sderot (IL)

(72) Inventors: Israel Grinwald, Sderot (IL); Alon Alfa, Sderot (IL); Rotem Golan, Sderot (IL); Yair Bar Yochi, Sderot (IL); Ariel Mordechai Chen, Sderot (IL)

(73) Assignee: ELBIT SECURITY SYSTEMS LTD., Sderot (IL)

( * ) Notice: Subject to any disclaimer, the term of this patent is extended or adjusted under 35 U.S.C. 154(b) by 50 days.

(21) Appl. No.: 18/408,606

(22) Filed: Jan. 10, 2024

(65) Prior Publication Data

US 2024/0159502 A1 May 16, 2024

Related U.S. Application Data

(63) Continuation of application No. PCT/IL2022/050494, filed on May 12, 2022.

(30) Foreign Application Priority Data

Jul. 15, 2021 (IL) .......................................... 284937

(51) Int. Cl.
*F41G 3/16* (2006.01)
*F41G 3/12* (2006.01)

(52) U.S. Cl.
CPC .............. *F41G 3/165* (2013.01); *F41G 3/12* (2013.01)

(58) Field of Classification Search
CPC .................................. F41G 3/165; F41G 3/12

USPC ............................................................ 42/90
See application file for complete search history.

(56) References Cited

U.S. PATENT DOCUMENTS

| | | |
|---|---|---|
| 4,531,052 A | 7/1985 | Moore |
| 4,777,352 A | 10/1988 | Moore |
| 4,786,966 A | 11/1988 | Hanson et al. |
| 5,365,669 A | 11/1994 | Rustick et al. |

(Continued)

FOREIGN PATENT DOCUMENTS

| | | |
|---|---|---|
| EP | 0773422 A1 | 1/2002 |
| EP | 1772695 B1 | 7/2010 |

(Continued)

*Primary Examiner* — Samir Abdosh
(74) *Attorney, Agent, or Firm* — S.J. Intellectual Property Ltd.

(57) ABSTRACT

The presently disclosed subject matter aims to a modular combat system and method. The modular combat system and method includes: a display; an imaging sensor; a foregrip detachably mounted to a firearm including at least one programmable interface element; and, a processing circuitry in communication with the imaging sensor, the display, and the at least one programmable interface element, the processing circuitry is configured to: obtain information from the imaging sensor associated with a scene captured by the imaging sensor; in response to an instruction provided by an operator of the modular combat system, through an interaction with the at least one programmable interface element, process the information obtained front the imaging sensor, in accordance with the instruction, so as to generate a processed image of the scene; and, present the processed image of the scene on the display.

20 Claims, 3 Drawing Sheets

(56) References Cited

U.S. PATENT DOCUMENTS

| | | |
|---|---|---|
| 5,686,690 A | 11/1997 | Lougheed et al. |
| 5,711,104 A | 1/1998 | Schmitz |
| 5,834,676 A | 11/1998 | Unseen |
| 6,449,892 B1 | 9/2002 | Jenkins |
| 8,458,944 B2 | 6/2013 | Houde-Walter et al. |
| 9,021,934 B1 * | 5/2015 | Hagerty .................. F41G 3/165 89/41.05 |
| 2006/0121993 A1 | 6/2006 | Scales et al. |
| 2007/0205937 A1 | 9/2007 | Thompson et al. |
| 2008/0001674 A1 | 1/2008 | Erwin et al. |
| 2009/0205239 A1 | 8/2009 | Smith, III |
| 2009/0287363 A1 | 11/2009 | Young |
| 2010/0031552 A1 | 2/2010 | Houde-Walter |
| 2011/0261204 A1 | 10/2011 | Smith |
| 2012/0042559 A1 | 2/2012 | Bockmon et al. |
| 2012/0053878 A1 | 3/2012 | Windauer et al. |
| 2012/0102808 A1 | 5/2012 | Matthews et al. |
| 2012/0106170 A1 | 5/2012 | Matthews et al. |
| 2013/0061504 A1 | 3/2013 | Malherbe et al. |
| 2014/0002885 A1 | 1/2014 | Graham et al. |
| 2014/0110482 A1 | 4/2014 | Bay |
| 2014/0123535 A1 | 5/2014 | Thomas |
| 2014/0226214 A1 | 8/2014 | Edwards et al. |
| 2014/0319215 A1 | 10/2014 | Farca et al. |
| 2015/0020463 A1 | 1/2015 | Toubia et al. |
| 2015/0338191 A1 | 11/2015 | Maryfield et al. |
| 2016/0029892 A1 | 2/2016 | Charles et al. |
| 2016/0109210 A1 | 4/2016 | Lupher et al. |
| 2016/0223293 A1 | 8/2016 | Maryfield et al. |
| 2016/0290765 A1 | 10/2016 | Maryfield et al. |
| 2016/0377383 A1 * | 12/2016 | Downing ................... F41G 9/00 42/111 |
| 2017/0339395 A1 | 11/2017 | Hall |
| 2017/0357002 A1 | 12/2017 | Winker et al. |
| 2018/0164074 A1 | 6/2018 | Tubb |
| 2018/0252500 A1 | 9/2018 | Maryfield et al. |
| 2018/0292172 A1 | 10/2018 | Ehrlich |
| 2019/0072754 A1 * | 3/2019 | Lv ........................ G02B 23/105 |
| 2019/0113310 A1 | 4/2019 | Peel et al. |
| 2019/0219813 A1 * | 7/2019 | Summerfield .......... F41G 1/345 |
| 2020/0232762 A1 | 7/2020 | Hamilton et al. |
| 2020/0256641 A1 | 8/2020 | Lyren |
| 2021/0071993 A1 * | 3/2021 | Baggio .................... F41G 1/16 |
| 2023/0175815 A1 * | 6/2023 | Mock ....................... F41G 1/35 42/146 |

FOREIGN PATENT DOCUMENTS

| | | |
|---|---|---|
| EP | 2634523 A1 | 9/2019 |
| EP | 3247969 B1 | 8/2020 |
| KR | 101977876 B1 | 8/2019 |
| WO | 1996001404 A1 | 1/1996 |
| WO | 2020106340 A2 | 5/2020 |
| WO | 2021048307 A1 | 3/2021 |

* cited by examiner

MODULAR COMBAT SYSTEM AND METHOD

TECHNICAL FIELD

The present invention relates to the field of modular combat systems and methods.

BACKGROUND

Modern warfare has continuously evolved over the past decades, with the advent of new technological improvements, which have led to the formation of weapons that can be targeted at increasing levels of speed and accuracy, enabling weapon operators to react more quickly to sudden changes in a given situation.

While tanks, jets, missiles, combat planning systems, and other technological implements have kept pace with modern electronics, some familiar tools of modern warfare have remained virtually unchanged for centuries. Perhaps foremost among these essential components is the infantryman, i.e., the soldier carrying light arms deployed on foot.

Although infantrymen have benefited to some extent from modern technology advancement, with the advent of laser sights, night vision goggles, and the like, most of these components, if not all, are stand-alone, and as such, are directed to provide the infantryman with a specific solution to a specific need.

This approach of fulfilling specific needs of the infantryman, without forming any interaction between the components answering those needs, avert the infantryman from grasping the full picture of the situation in which he or she is in (as he or she receives only fragments of information from each component), which can potentially put the infantryman's life at risk.

Thus, there is a need in the art for a new modular combat system and method.

GENERAL DESCRIPTION

In accordance with a first aspect of the presently disclosed subject matter, there is provided a modular combat system comprising: a display; an imaging sensor; a foregrip detachably mounted to a firearm including at least one programmable interface element; and, a processing circuitry in communication with the imaging sensor, the display, and the at least one programmable interface element, the processing circuitry is configured to: obtain information from the imaging sensor associated with a scene captured by the imaging sensor; in response to an instruction provided by an operator of the modular combat system, through an interaction with the at least one programmable interface element, process the information obtained from the imaging sensor, in accordance with the instruction, so as to generate a processed image of the scene; and present the processed image of the scene on the display.

In some cases, the presented processed image introduces data being generated by components of the modular combat system.

In some cases, the display is detachably mounted to a designated gear.

In some cases, the designated gear is a headgear.

In some cases, the headgear is a helmet.

In some cases, the designated gear is a binocular.

In some cases, the designated gear is the firearm.

In some cases, the display is a see-through display placed in front, or behind, a sight of the firearm.

In some cases, the processing circuitry is positioned in the foregrip.

In some cases, the processing circuitry is configured to perform a calibration process utilizing the display, based on information acquired by the imaging sensor and on one or more properties of a sight of the firearm, wherein the calibration process does not include firing the firearm.

In some cases, the processing circuitry is configured to perform a ballistic estimation process on said firearm.

In some cases, the processing circuitry is configured to perform a range correction process utilizing the display, based on information acquired by the imaging sensor and on one or more properties of a sight of the firearm.

In some cases, the processing circuitry is in further communication with at least one sensor associated with the firearm.

In some cases, the processing circuitry is configured to perform a parallax correction process utilizing the display, based on information acquired by the imaging sensor and on one or more properties of a sight of the firearm.

In some cases, the processing circuitry is configured to perform an object movement correction process utilizing the display, based on information acquired by the imaging sensor and on one or more properties of a sight of the firearm.

In some cases, the processing circuitry is in further communication with at least one other modular combat system processing circuitry of at least one modular combat system other than the modular combat system, so as to enable interaction between the modular combat system and the at least one other modular combat system.

In some cases, the processing circuitry is in wireless communication with the at least other modular combat system processing circuitry of the at least other modular combat system.

In some cases, the communication between the processing circuitry and the at least one other modular combat system processing circuitry enables: (a) receiving at least one other sensor data, associated with the scene, from the at least one other modular combat system, wherein the at least one other sensor data associated with the scene is different than the data associated with the imaging sensor, and (b) processing the data associated with the imaging sensor and the at least one other sensor data to generate a multi-view sensor data of the scene.

In some cases, the data associated with the imaging sensor and the at least one other sensor data are images of the scene from different angles.

In some cases, the interaction between the processing circuitry and the at least one other modular combat system processing circuitry of at least one modular combat system other than the modular combat system enable the creation of a communication network.

In accordance with a second aspect of the presently disclosed subject matter, there is provided a method comprising: obtaining, by a processing circuitry in communication with an imaging sensor, a display, and at least one programmable interface element, information from the imaging sensor associated with a scene captured by the imaging sensor; processing, by the processing circuitry, the information obtained from the imaging sensor, in accordance with an instruction provided by an operator, through an interaction with the at least one programmable interface element positioned on a foregrip being detachably mounted to a firearm, so as to generate a processed image of the scene; and, presenting the processed image of the scene on a display.

In some cases, the processed image introduces data being generated by components of the modular combat system.

In some cases, the display is detachably mounted to a designated gear.

In some cases, the designated gear is a headgear.

In some cases, the headgear is a helmet.

In some cases, the designated gear is a binocular.

In some cases, the designated gear is the firearm.

In some cases, the display is a see-through display placed in front, or behind, a sight of the firearm.

In some cases, the processing circuitry is positioned in the foregrip.

In some cases, the processing circuitry is configured to perform a calibration process utilizing the display, based on information acquired by the imaging sensor and on one or more properties of a sight of the firearm, wherein the calibration process does not include firing the firearm.

In some cases, the processing circuitry is configured to perform a ballistic estimation process on said firearm.

In some cases, the processing circuitry is configured to perform a range correction process utilizing the display, based on information acquired by the imaging sensor and on one or more properties of a sight of the firearm.

In some cases, the processing circuitry is in further communication with at least one sensor associated with the firearm.

In some cases, the processing circuitry is configured to perform a parallax correction process utilizing the display, based on information acquired by the imaging sensor and on one or more properties of a sight of the firearm.

In some cases, the processing circuitry is configured to perform an object movement correction process utilizing the display, based on information acquired by the imaging sensor and on one or more properties of a sight of the firearm.

In some cases, the processing circuitry is in further communication with at least one other modular combat system processing circuitry of at least one modular combat system other than the modular combat system, so as to enable interaction between the modular combat system and the at least one other modular combat system.

In some cases, the processing circuitry is in wireless communication with the at least other modular combat system processing circuitry of the at least other modular combat system.

In some cases, the communication between the processing circuitry and the at least one other modular combat system processing circuitry enables: (a) receiving at least one other sensor data, associated with the scene, from the at least one other modular combat system, wherein the at least one other sensor data associated with the scene is different than the data associated with the imaging sensor, and (b) processing the data associated with the imaging sensor and the at least one other sensor data to generate a multi-view sensor data of the scene.

In some cases, the data associated with the imaging sensor and the at least one other sensor data are images of the scene from different angles.

In some cases, the interaction between the processing circuitry and the at least one other modular combat system processing circuitry of at least one modular combat system other than the modular combat system enable the creation of a communication network.

In accordance with a third aspect of the presently disclosed subject matter, there is provided a non-transitory computer readable storage medium having computer readable program code embodied therewith, the computer readable program code, executable by at least one processor to perform a method, the method comprising one or more components, the method comprising: obtaining, by a processing circuitry in communication with an imaging sensor, a display, and at least one programmable interface element, information from the imaging sensor associated with a scene captured by the imaging sensor; processing, by the processing circuitry, the information obtained from the imaging sensor, in accordance with an instruction provided by an operator, through an interaction with the at least one programmable interface element positioned on a foregrip being detachably mounted to a firearm, so as to generate a processed image of the scene; and, presenting the processed image of the scene on a display.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1A:
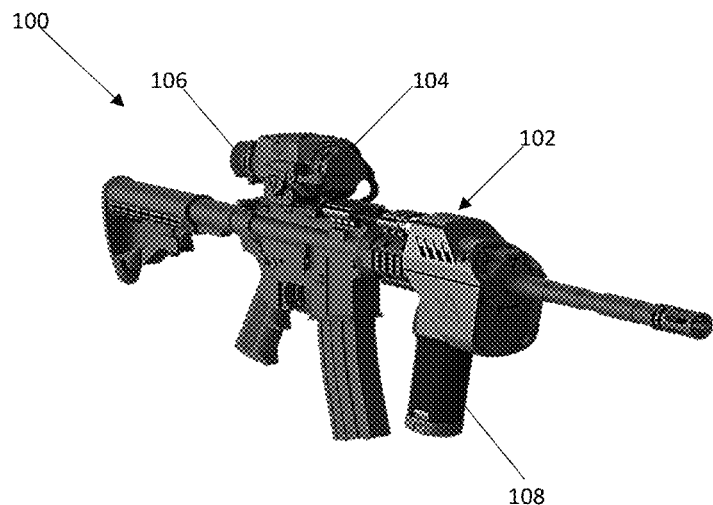
FIG. 1A-1B are schematic illustrations of a modular combat system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "processing", "generating", "presenting", "preforming" or the like, include action and/or processes of a computer that manipulate and/or transform data into other data, said data represented as physical quantities, e.g., such as electronic quantities, and/or said data representing the physical objects. The terms "computer", "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example", "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject flatter, which are, for brevity, described in the context of a single embodiment, may also be provided separately or in any suitable sub-combination.

Figure 2:
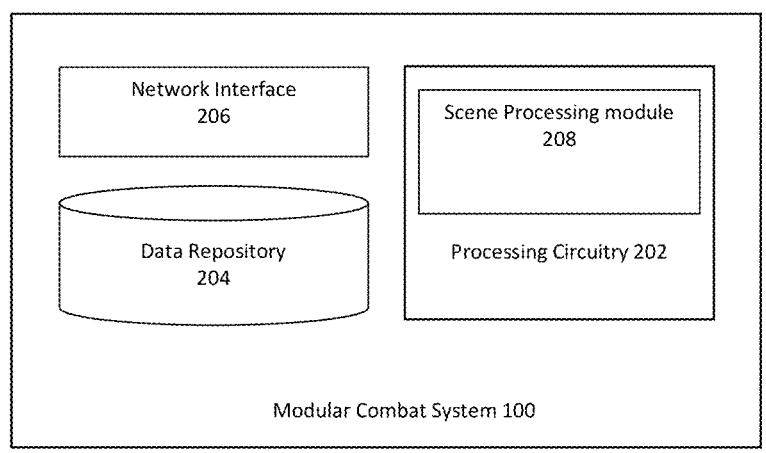
FIG. 2 is a block diagram schematically illustrating one example of a modular combat system, in accordance with the presently disclosed subject matter; and, FIG. 3 is a flowchart illustrating one example of a sequence of operations carried out by a modular combat system, in accordance with the presently disclosed subject matter.
Figure 3:
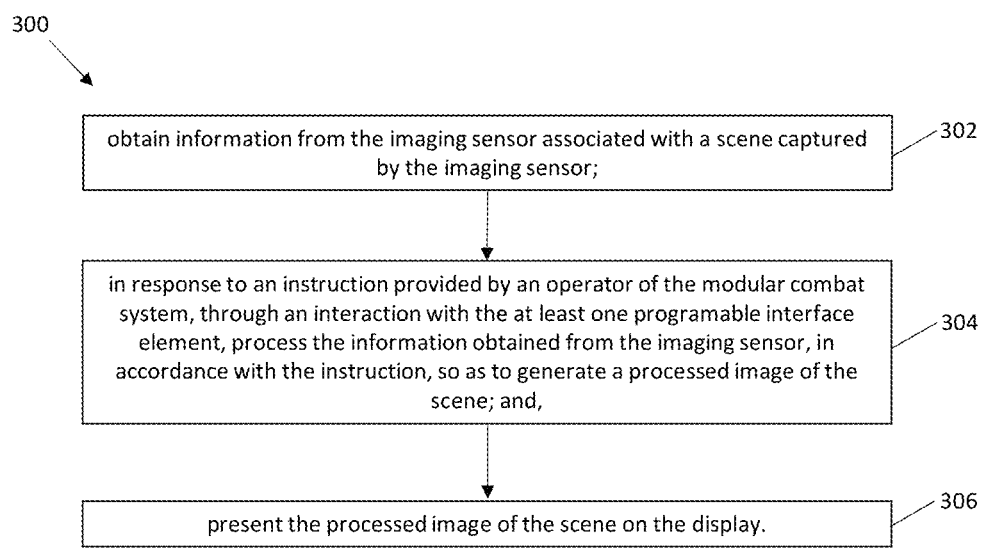

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIGS. 1 and 2 illustrate a general schematic of the system architecture in accordance with an embodiment of the presently disclosed subject matter. Each module in FIG. 2 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Figure 1B:
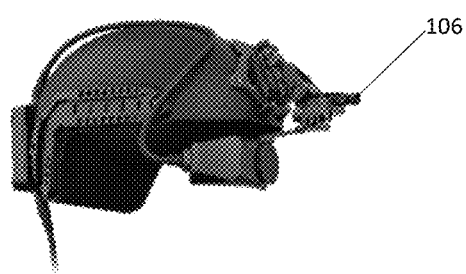

Bearing this in mind, attention is drawn to FIG. 1A, showing a schematic illustration of a modular combat system (also interchangeably referred to herein as "system") operates, in accordance with the presently disclosed subject matter.

As shown in the schematic illustration, modular combat system 100 includes an imaging sensor 104, a display 106, and a foregrip 108, each mounted, for example, on a firearm 102, directed to be carried by an operator (e.g., a hunter, an infantryman, and the like) during an armed activity (for example, during hunting, during combat, etc.). The firearm 102 can be any man-portable lethal weapon for individual use, for example, handguns, namely revolvers and self-loading pistols, and long guns, namely rifles, sub-machine guns, assault rifles, light machine guns, and so forth.

The imaging sensor 104, which can be any imaging sensor known in the art suitable to operate in accordance with the presently disclosed subject matter (e.g., a camera, a charge coupled device (CCD), an active pixel sensor (CMOS sensor), and the like), can be in communication with the firearm's 102 sight and can capture an image of a scene, for example, a battle scene, unfolding in the vicinity of the firearm 102, as it would have been displayed on the firearm's 102 sight. The imaging sensor 104 can be detachably mounted to the firearm's 102 body and be placed on different regions of the firearm's 102 body (e.g., the bottom region of the firearm's 102 body, the side region of the firearm's 102 body, etc.), such that it can be assembled or removed on or from the firearm's 102 body as needed.

The display 106, which can be any display known in the art suitable to operate in accordance with the presently disclosed subject matter (for example, a reflector sight, a see-through display, and the like), can be directed to present to the operator operating the modular combat system 100 the image of the scene captured by the imaging sensor 104. The display 106 can also be detachably mounted to the firearm's 102 body so as to be placed on different regions of the firearm's 102 body and be assembled or removed on or from the firearm's 102 body as needed. For example, the display 106 can be a see-through display, placed in front or behind the firearm's 102 sight, allowing the operator to view display 106 together with the firearm's 102 sight. In these cases, the operator of the modular combat system 100 can view the display 106 while in an operational shooting position.

In some cases, the display 106 is a non-see-through display, which can be directed to display all the information associated with the firearm's 102 sight to the operator of the modular combat system 100.

In some cases, the display 106 is not detachably mounted to the firearm's 102 body but rather to a designated gear worn by the operator of the modular combat system 100. The designated gear, which can be part of the modular combat system 100 or a stand-alone gear, can be, for example, a headgear (e.g., a helmet (FIG. 1B)), a binocular, and the like. In such cases, the operator of the modular combat system 100 does not need to look through the firearm's 102 sight in order to aim for a designated target, as the image of the scene displayed on the firearm's 102 sight is presented to him on the display 106. This allows the operator of the modular combat system 100 to fire on the designated target from a hideout, e.g., from around a corner of a wall, and from different regions of his body, for example, from his waist.

The foregrip 108, which can be any foregrip known in the art suitable to operate in accordance with the presently disclosed subject matter (for example, a vertical foregrip, an angled foregrip, a handstop foregrip, etc.), can too be detachably mounted to the firearm's 102 body. Other than its intended use of aiding in the maneuverability of the firearm 102, as it is being grasped by the frontal support hand (or "offhand"), the foregrip 108 may further include one or more programmable interface elements (not shown). The one or more programmable interface elements, which can be, for example, any one of: knobs, buttons, sliders, switches, touchscreens, and the like, can be directed to enable the operator operating the modular combat system 100 to provide instructions to modular combat system 100, which are associated with the processing of any information acquired by any component of the modular combat system 100, as well as other components associated with the operator's gear, so as to display the processed information to the operator through, for example, the display 106, as further detailed herein, inter alia, with reference to FIG. 3.

In some cases, the foregrip 108 can house a processing circuitry, for example, processing circuitry 202, which will be further explained hereafter in reference to FIGS. 2 and 3. Locating processing circuitry 202 in the foregrip 108 may enable improved connectivity of the processing circuitry 202 with components of the modular combat system 100, as well as other components associated with the operator's gear. For example, the imaging sensor 104 can be located in a front part of firearm 102, causing the connectors to the processing circuitry 202, which is located in the foregrip 108, to be short.

In some cases, the modular combat system 100 further includes an energy source (for example, a battery, e.g., a rechargeable battery, and the like) housed in a component of the modular combat system 100, for example, the foregrip 108, or in another component of the operator's gear. The energy source can be directed to provide components of the modular combat system 100, and/or of other gears of the operator, the necessary electrical energy for them to operate.

In some cases, one or more components of the modular combat system 100 can interact with other systems that are not necessarily in direct association with the operator's gear. For example, the display 106 and the processing circuitry 202 can be in communication with an observation system or a drone, such that information acquired by the observation system or the drone can be transferred to the display 106 and the processing circuitry 202 so as to be used by the modular combat system 100 and/or to be displayed to the modular combat system's 100 operator. Alternatively or additionally to the above, the processing circuitry 202 can provide the observation system or the drone with instructions relating to their operation. In a non-limiting example referring to the description of FIG. 1A, an infantryman carrying an M-16 rifle, on which the components of the modular combat system 100 are mounted, is entering an ongoing battle scene. The components of the modular combat system 100, which are a charge coupled device (CCD) 104, a see-through sight 106, and a vertical foregrip 108, are distributed on the M-16's 102 body, such that the charge coupled device (CCD) 104 is mounted on the side of the M-16's 102 body, the see-through sight 106 is mounted in front of a sight of the M-16 102, and the vertical foregrip 108 is mounted on the bottom region of the M-16's 102 body.

Attention is now drawn to the components of the modular combat system 100.

FIG. 2 is a block diagram schematically illustrating one example of the modular combat system 100, in accordance with the presently disclosed subject matter.

In accordance with the presently disclosed subject matter, modular combat system 100 (also interchangeably referred to herein as "system 100") can comprise a network interface 206. The network interface 206 (e.g., a network card, a Wi-Fi client, a LiFi client, 3G/4G client, or any other component), enables system 100 to communicate over a network with external systems and handles inbound and outbound communications from such systems. For example, system 100 can receive, through network interface 206, one or more images of a scene acquired by the imaging sensor 104 so as to be processed and presented to an operator on the display 106. In addition, system 100 can receive information acquired by other modular combat systems being in network communication with system 100, through network interface 206.

System 100 can further comprise or be otherwise associated with a data repository 204 (e.g., a database, a storage system, a memory including Read Only Memory—ROM, Random Access Memory—RAM, or any other type of memory, etc.) configured to store data, optionally including, inter alia, images of a scene, past ballistic estimation processes, past calibration processes, past range correction processes, past communication sessions between system 100 and other modular combat systems, past parallax correction processes, past object movement correction processes, instruction patterns customized for different military activities, past communications with other modular combat systems 100 being in network communication with system 100, etc. Data repository 204 can be further configured to enable retrieval and/or update and/or deletion of the stored data. It is to be noted that in some cases, data repository 204 can be distributed, while the system 100 has access to the information stored thereon, e.g., via a wired or wireless network to which system 100 is able to connect (utilizing its network interface 206).

System 100 further comprises processing circuitry 202. Processing circuitry 202 can be one or more processing units (e.g., central processing units), microprocessors, microcontrollers (e.g., microcontroller units (MCUs)) or any other computing devices or modules, including multiple and/or parallel and/or distributed processing units, which are adapted to independently or cooperatively process data for controlling relevant system 100 resources and for enabling operations related to system's 100 resources. In some cases, processing circuitry 202 can have an open architecture enabling it to host any application (e.g., command and control, situational awareness, motion detection, etc.) and connect to various sensors, controls and displays on and off the weapon 102.

The processing circuitry 202 comprises a scene processing module 208, configured to perform a scene processing process, as further detailed herein, inter alia with reference to FIG. 3.

Turning to FIG. 3, there is shown a flowchart illustrating one example of a sequence of operations carried out for processing information acquired by one or more components of a modular combat system, in accordance with the presently disclosed subject matter.

Accordingly, the modular combat system can be configured to perform a scene processing process 300, e.g., using scene processing module 208.

For this purpose, the modular combat system 100, through its scene processing module 208, obtains information from the imaging sensor 104. The obtained information is associated with a given scene captured by the imaging sensor 104 (block 302), for example, a battle scene, and can include, e.g., any data used to make an image of the given scene by the imaging sensor 104. Moreover, the modular combat system 100 can also obtain additional information regarding the given scene, generated by other components of the modular combat system 100, as well as by additional sources associated with other systems of the operator. For example, the modular combat system 100 can receive information regarding the given scene from a binocular and/or a night-vision mean that are part of the operator's gear.

Once the information associated with the given scene is obtained, the operator can instruct the modular combat system 100, through an interaction with its one or more programmable interface elements (e.g., through pressing, rotating, moving, etc.), to process the information in accordance with the instruction given by him, so as to generate a processed image of the given scene (block 304) to be presented to the operator on the display 106 (block 306). The processed image can be an overlay image of the given scene including data concerning, e.g., different measurements relating to the given scene, different objects of the given scene, the use of the firearm 102, and the like, which can be determined according to the obtained information associated with the given scene. For example, the processed image can introduce to the operator operating the modular combat system 100: an indication of the distance between him and every object in the given scene, an indication of the location of other individuals in his unit or group, an indication regarding the number of bullets remaining in the firearm's 102 magazine, an indication regarding his indices, etc.

In some cases, the modular combat system 100 can include laser coding capabilities, via, for example, a laser device (e.g., a laser range finder), directed to provide the operator of the system 100 the ability to transmit and receive laser beams so as to determine, for example, a distance from an object, the identity of an object (e.g., an ally or an enemy), and the like.

In some cases, the modular combat system 100 can include navigation capabilities, via, e.g., a Global Positioning System (GPS) device, enabling it to provide its operator with, for example, information regarding his next destination, trail identification, and the like. In other cases, additionally or alternatively to the cases above, the modular combat system 100 can provide its operator with an indication of firing, or suspicious movements.

In accordance with and following our continuing example referring to FIG. 1A, during the ongoing battle, the charge coupled device (CCD) 104 captures an image of the battle scene, in which three hostile individuals are positioned next to a tree. The infantryman operating the modular combat system 100 presses a designated programmable button positioned on the vertical foregrip 108, providing an instruction to the modular combat system 100 to calculate the distance between him and each hostile individual of the three hostile individuals. As the calculation process is completed, the calculated distance from each of the three hostile individuals is presented to the infantryman on the see-through sight 106, on top of the captured image of the three hostile individuals.

To be able to provide its operator with data related to the obtained information associated with the given scene captured by the imaging sensor 104, the modular combat system 100 can utilize the information acquired from the imaging sensor 104, as well as any information received from other components of the operator's gear (for example, one or more properties of a sight of the firearm 102), to perform a number of processes, e.g., a range correction process, a ballistic correction process, a parallax correction process, an object movement correction process, and a calibration process.

The range correction process may be performed, for example, by aiming the firearm 102 towards the location of an object of interest within a scene and entering its type (e.g., a person, a vehicle, a window of a building, etc.) into the modular combat system 100, for example, using the one or more programmable interface elements. Once the type is entered, the modular combat system 100 displays two diagonal lines across the display 106, with a given width between them. The operator moves the lines up or down, using, for example, the one or more programmable interface elements, until the width matches the upper and lower boundaries of the object of interest, as it is seen on the display 106. At this stage, the modular combat system 100 calculates the range to the object of interest based on, for example, a standard/average height of objects of that same type and on the actual height associated with the selected object of interest. With the completion of the calculation, the modular combat system 100 displays a reticle on the display 106, which is range corrected in accordance with the range to the object of interest. In our continuing example, the infantryman operating the modular combat system 100 aims his M-16 rifle towards a hostile individual of the three hostile individuals captured in the image of the battle scene, and enters its type, a person, using a designated button positioned on the vertical foregrip 108. The modular combat system 100, through its see-through sight 106, presents to the infantryman the image of the battle scene containing the hostile individual of interest, with two diagonal lines. The infantryman moves the diagonal lines, through an interaction with the designated button, until the width between the lines matches the upper and lower boundaries of the hostile individual. Once the diagonal lines are in place, the modular combat system 100 calculates the distance to the hostile individual based on the average height of a person and the actual height of the hostile individual. The calculated distance from the hostile individual is then displayed to the infantryman on the see-through sight 106.

In some cases, additionally or alternatively to the process described above, the range correction process may be performed using an optical sensor mounted, for example, on the firearm's 102 body, and directed to view the scene as it is viewed through the display 106. In such cases, the modular combat system 100 analyses the images coming from the optical sensor and determines an area of the images, which includes a target of interest, by utilizing an Automated Target Recognition (ATR) algorithm. The ATR algorithm further determines the type of the target of interest (e.g., a person, a vehicle, a window of a building, etc.), which causes the modular combat system 100 to calculate the range to the target of interest based on, for example, a standard height of targets of that same type, as well as on the actual height associated with the area of the image that includes the target of interest. At the end of the calculation, the modular combat system 100 displays a reticle on the display 106 that is range corrected in accordance with the range to the target of interest. In our continuing example, the infantryman aims his M-16 rifle, which includes an optical sensor positioned near its see-through sight 106, towards the battle scene containing the three hostile individuals. The modular combat system 100 analyses the images of the battle scene, containing the three hostile individuals, coming from the optical sensor and determines an area of the images, which includes one hostile individual of interest out of the three hostile individuals, by utilizing ATR algorithm. The ATR algorithm determines that the type of the hostile individual of interest is a person, and the modular combat system 100 calculates the range to the hostile individual of interest based on a standard height of a person, as well as on the actual height associated with the area of the image that includes the hostile individual of interest. The modular combat system 100 then displays a reticle on the see-through sight 106 that is range corrected in accordance with the range to the hostile individual of interest.

The ballistic correction process may be performed, for example, by considering the weapon type, ammunition type, gun barrel deviations, and the sight's parallax correction. Each of these components can be obtained by the modular combat system 100 separately and can be analyzed so as to provide an overall ballistic correction. For example, the weapon type, ammunition type, and gun barrel deviations may be entered to the modular combat system 100 manually, by the operator operating the system 100, using the one or more programmable interface elements, while the sight's parallax correction may be determined by the modular combat system 100 using a parallax correction process. The parallax correction process may be performed, for example, using an optical sight, as follows: (a) in cases where the optical sight is not connected to the firearm's 102 body—using a laser beam that is emitted in-line with the weapon's 102 barrel (e.g., by using a laser boresight) and manually inputting to the modular combat system 100 (e.g., using one or more programmable interface elements) the deviation between the point to which the weapon's 102 sight is directed and the point of the laser light, (b) in cases where the optical sight is connected to the firearm's 102 body—using a pre-devised target with a known shape or pattern. The modular combat system 100 analyzes the images coming from the optical sight to recognize the target, while the user changes its position at a known distance repeatedly. The modular combat system 100 automatically determines the parallax correction from the information of at least two images in which the target was recognized.

With the completion of the ballistic correction process, the modular combat system 100 displays a reticle on the display 106, which is corrected according to the overall ballistic correction. In our continuing example, a telescopic optical sight is mounted on the body of the M-16 rifle, which is carried by the infantryman. The infantryman enters the weapon type, M-16 rifle, ammunition type, 5.56 mm, and gun barrel deviations, 0.5 mm, using designated programmable buttons positioned on the vertical foregrip 108, while the modular combat system 100 performs a parallax correction process utilizing the known shape or pattern of a person (i.e., the hostile individual of interest). As part of the parallax correction process, the infantryman repeatedly changes its position by one meter at a time, whilst the modular combat system 100 analyzes images of the battle scene, including the three hostile individuals, coming from the optical sight, to recognize the hostile individual of interest. The modular combat system 100 automatically determines the parallax correction using the information acquired from four images, in which the hostile individual of interest was recognized. The modular combat system 100 amalgamate the information entered by the infantryman and the results of the parallax correction process and displays a duplex reticle on the see-through sight 106, which is corrected according to the amalgamated information.

The object movement correction process may be performed, for example, by determining ballistic correction to a moving target. The ballistic correction determination is made by calculating the target of interest's velocity using, for example, (a) any video motion detection methods known in the art, or (b) an accelerometer placed on the weapon's 102 body, directed to acquire readings of angular rates of the weapon 102 as the user moves the weapon 102 to track the target of interest. As the ballistic correction determination is completed, the modular combat system 100 displays a reticle on the display 106, which is corrected according to the object movement correction. In our continuing example, the hostile individual of interest, out of the three hostile individuals in the battle scene, begins to run. The infantryman moves and aims his M-16 rifle towards the running hostile individual, while a three-dimensional accelerometer placed on the M-16 rifle's 102 body acquires readings of angular rates of the M-16 rifle 102, so as to determine the ballistic correction to the running hostile individual. The readings of angular rates of the M-16 rifle 102, acquired by the three-dimensional accelerometer, are analyzed by the modular combat system 100 and a reticle on the see-through sight 106 that is corrected in accordance with the movement of the hostile individual of interest, is displayed.

The calibration process may be performed, for example, using a laser boresight, which generates a laser beam that is emitted in-line with the weapon's 102 barrel. The laser beam is captured by the imaging sensor 104, enabling the modular combat system 100 to detect any deviation between the point to which the weapon's 102 sight is directed and the point of the laser light. In our continuing example, the infantryman aims his M-16 rifle 102 towards a specific point in the battle scene, while a laser boresight, placed within the M-16 rifle's 102 barrel, transmits a laser beam towards the specific point. The charge coupled device (CCD) 104 captures the laser beam transmitted, and the modular combat system 100 compares the laser light to the point to which the M-16 rifle's 102 sight is directed. In cases which the point of the laser light deviates from the point to which the weapon's 102 sight is directed, the modular combat system 100 corrects the deviation accordingly.

In some cases, the modular combat system 100 can form a communication network by interacting with one or more other modular combat systems mounted, for example, on weapons carried by individuals found in the same unit or group as the operator carrying the weapon 102. The formation of the communication network can be achieved, for example, through wireless communication, using the network interface 206 and the network interfaces of the one or more other modular combat systems, and can enable, for example, (a) receiving at least one other sensor data (e.g., images of the scene from different angles), associated with the scene, from a sensor of the one or more other modular combat systems that is different than the data associated with the imaging sensor 104, and (b) processing the data associated with the imaging sensor 104 and the at least one other sensor data to generate a multi-view sensor data of the scene. In our continuing example, the infantryman is part of a military unit of 12 infantrymen surrounding the three hostile individuals. Each of the 12 infantrymen is carrying an M-16 rifle on which the modular combat system 100 is mounted. The modular combat systems of the unit of 12 infantrymen are in wireless communication with one another, such that each modular combat system 100 shares the images acquired by it with the other modular combat systems, allowing each modular combat system 100 to create a multi-view image of the battle scene containing the three hostile individuals. The multi-view image of the battle scene is presented to each of the 12 infantrymen of the unit such that the commander of the unit can provide each of his 11 infantrymen with a specific order as to how to act next.

It is to be noted, with reference to FIG. 3, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A modular combat system comprising:
   a display;
   an imaging sensor;
   a foregrip detachably mounted to a firearm including at least one programmable interface element; and,
   a processing circuitry in communication with the imaging sensor, the display, and the at least one programmable interface element, the processing circuitry is configured to:
      obtain information from the imaging sensor associated with a scene captured by the imaging sensor;
      based on the information obtained, (a) perform a ballistic estimation process on said firearm, and (b) in response to an instruction provided by an operator of the modular combat system, through an interaction with the at least one programmable interface element, process said information senses, in accordance with said instruction, so as to generate a processed image of the scene; and,
      present the processed image of the scene on the display.

2. The modular combat system of claim 1, wherein the presented processed image introduces data being generated by components of the modular combat system.

3. The modular combat system of claim 1, wherein the processing circuitry is configured to perform a calibration process utilizing the display, based on information acquired by the imaging sensor and on one or more properties of a sight of the firearm, wherein the calibration process does not include firing the firearm.

4. The modular combat system of claim 1, wherein the processing circuitry is configured to perform a range correction process utilizing the display, based on information acquired by the imaging sensor and on one or more properties of a sight of the firearm.

5. The modular combat system of claim 1, wherein the processing circuitry is configured to perform a parallax correction process utilizing the display, based on information acquired by the imaging sensor and on one or more properties of a sight of the firearm.

6. The modular combat system of claim 1, wherein the processing circuitry is configured to perform an object movement correction process utilizing the display, based on information acquired by the imaging sensor and on one or more properties of a sight of the firearm.

7. The modular combat system of claim 1, wherein the processing circuitry is in further communication with at least one other modular combat system processing circuitry of at least one modular combat system other than the modular combat system, so as to enable interaction between the modular combat system and the at least one other modular combat system.

8. The modular combat system of claim 7, wherein the communication between the processing circuitry and the at least one other modular combat system processing circuitry enables: (a) receiving at least one other sensor data, associated with the scene, from the at least one other modular combat system, wherein the at least one other sensor data associated with the scene is different than the data associated with the imaging sensor, and (b) processing the data associated with the imaging sensor and the at least one other sensor data to generate a multi-view sensor data of the scene.

9. The modular combat system of claim 8, wherein the data associated with the imaging sensor and the at least one other sensor data are images of the scene from different angles.

10. The modular combat system of claim 7, wherein the interaction between the processing circuitry and the at least one other modular combat system processing circuitry of at least one modular combat system other than the modular combat system enable the creation of a communication network.

11. A method comprising:
    obtaining, by a processing circuitry in communication with an imaging sensor, a display, and at least one programmable interface element, information from the imaging sensor associated with a scene captured by the imaging sensor;
    based on the information obtained, (a) performing, by the processing circuitry, a ballistic estimation process on said firearm, and (b) processing, by the processing circuitry, said information, in accordance with an instruction provided by an operator, through an interaction with the at least one programmable interface element positioned on a foregrip being detachably mounted to a firearm, so as to generate a processed image of the scene; and,
    presenting the processed image of the scene on a display.

12. The method of claim 11, wherein the processing circuitry is configured to perform a calibration process utilizing the display, based on information acquired by the imaging sensor and on one or more properties of a sight of the firearm, wherein the calibration process does not include firing the firearm.

13. The method of claim 11, wherein the processing circuitry is configured to perform a range correction process utilizing the display, based on information acquired by the imaging sensor and on one or more properties of a sight of the firearm.

14. The method of claim 11, wherein the processing circuitry is configured to perform a parallax correction process utilizing the display, based on information acquired by the imaging sensor and on one or more properties of a sight of the firearm.

15. The method of claim 11, wherein the processing circuitry is configured to perform an object movement correction process utilizing the display, based on information acquired by the imaging sensor and on one or more properties of a sight of the firearm.

16. The method of claim 11, wherein the processing circuitry is in further communication with at least one other modular combat system processing circuitry of at least one modular combat system other than the modular combat system, so as to enable interaction between the modular combat system and the at least one other modular combat system.

17. The method of claim 16, wherein the communication between the processing circuitry and the at least one other modular combat system processing circuitry enables: (a) receiving at least one other sensor data, associated with the scene, from the at least one other modular combat system, wherein the at least one other sensor data associated with the scene is different than the data associated with the imaging sensor, and (b) processing the data associated with the imaging sensor and the at least one other sensor data to generate a multi-view sensor data of the scene.

18. The method of claim 17, wherein the data associated with the imaging sensor and the at least one other sensor data are images of the scene from different angles.

19. The method of claim 16, wherein the interaction between the processing circuitry and the at least one other modular combat system processing circuitry of at least one modular combat system other than the modular combat system enable the creation of a communication network.

20. A non-transitory computer readable storage medium having computer readable program code embodied therewith, the computer readable program code, executable by at least one processor to perform a method, the method comprising one or more components, the method comprising:
  obtaining, by a processing circuitry in communication with an imaging sensor, a display, and at least one programmable interface element, information from the imaging sensor associated with a scene captured by the imaging sensor;
  based on the information obtained, (a) performing, by the processing circuitry, a ballistic estimation process on said firearm, and (b) processing, by the processing circuitry, said information, in accordance with an instruction provided by an operator, through an interaction with the at least one programmable interface element positioned on a foregrip being detachably mounted to a firearm, so as to generate a processed image of the scene; and,
  presenting the processed image of the scene on a display.

* * * * *